United States Patent [19]

Matsumoto et al.

[11] Patent Number: 5,242,634

[45] Date of Patent: Sep. 7, 1993

[54] METHOD OF PRODUCING OPEN-CELL FOAMS OF CROSS-LINKED POLYOLEFINS

[75] Inventors: Katsuya Matsumoto, Ishioka; Nobuyoshi Kotani, Hirakata; Naruyuki Ida, Hyogo; Yoshio Miyano, Kuze, all of Japan

[73] Assignee: Sanwa Kako Company Limited, Japan

[21] Appl. No.: 914,721

[22] Filed: Jul. 20, 1992

[30] Foreign Application Priority Data

Aug. 6, 1991 [JP] Japan .................................. 3-219349
Jun. 4, 1992 [JP] Japan .................................. 4-168267

[51] Int. Cl.⁵ .............................................. B29C 67/22
[52] U.S. Cl. .................................. 264/25; 264/51; 264/55; 264/321
[58] Field of Search ........................ 264/25, 26, 51, 55, 264/321, 46.3, 156

[56] References Cited

U.S. PATENT DOCUMENTS

| | | | |
|---|---|---|---|
| 4,372,898 | 2/1983 | Menges et al. | 264/26 |
| 4,384,049 | 5/1983 | Rametsteiner | 264/22 |
| 4,391,922 | 7/1983 | Harrell | 521/94 |
| 4,578,231 | 3/1986 | Molteni | 264/25 |
| 4,877,814 | 10/1989 | Ito | 264/321 |
| 5,070,124 | 12/1991 | Bohen et al. | 524/377 |

FOREIGN PATENT DOCUMENTS 63-35319 2/1988 Japan .
63-74629 4/1988 Japan .

*Primary Examiner*—Allan R. Kuhns
*Attorney, Agent, or Firm*—Ronald P. Kananen

[57] ABSTRACT

An open-cell foam of a cross-linked polyolefin possessing uniform physical properties, a high degree of expansion, and a high open-cell ratio can be produced with high operational efficiency and high material utilization by a method which includes thermally shaping under pressure a foamable and cross-linkable polyolefin composition capable of being heated with a microwave, then heating the composition by irradiation with a microwave thereby inducing partial decomposition of a cross-linking agent and a foaming agent contained in the composition, subsequently externally heating under normal pressure the resultant intermediate partially foamed product thereby effecting decomposition of the remainders of the cross-linking agent and foaming agent, and thereafter subjecting the resultant foam to mechanical deformation thereby establishing intercommunication among the cells. The surface of the foamable and cross-linkable polyolefin composition may be heated prior to the heating with a microwave to effect partial cross-linking of the surface part of the composition.

26 Claims, No Drawings

METHOD OF PRODUCING OPEN-CELL FOAMS OF CROSS-LINKED POLYOLEFINS

BACKGROUND OF THE INVENTION

1. Field of the Invention:

This invention relates to a method for the production of open-cell foams of cross-linked polyolefins.

2. Description of the Prior Art:

Heretofore, for the production of an open-cell foam of a cross-linked polyolefin, the method which comprises partially decomposing a foaming agent and a cross-linking agent in a foamable and cross-linkable polyolefin composition in a tightly closed metal mold under application of pressure, decomposing the remainders of the foaming agent and cross-linking agent under normal atmospheric pressure to obtain a closed-cell foam, and subsequently compressing the closed-cell foam thereby rupturing the closed cells in the closed-cell foam has been proposed (for example, see Japanese Patent Publication No. SHO 59-23545 and Japanese Patent Application laid open to public inspection, KOKAI No. SHO 56-146732). In the method of this sort, since the decomposition of foaming agent and cross-linking agent is effected by heating the composition in the tightly closed metal mold under application of pressure, the cross-linking reaction of polyolefin takes place but the formation of cells is suppressed, and the expansion of polyolefin occurs only after the release of applied pressure. That is, said method first induces the cross-linking reaction and thereafter incites the foaming. Since the so-called "preceding cross-linking" proceeds in the production of closed-cell foam, the membranes of the produced cells are so tough as to render difficult the rupture of the cell membranes and the creation of intercommunication among the cells of the foam. Thus, by this method a foam having an open-cell ratio of 100% or close to 100% could not be attained.

U.S. Pat. No. 4,435,346 to Ito et al. assigned to the assignee of this application and Japanese Patent Publication No. Hei 1-44,499 filed by the same assignee disclose methods for the solution of the problem mentioned above. These methods basically comprise thermally shaping a foamable and cross-linkable polyolefin composition into a desired shape, then heating the shaped composition under normal atmospheric pressure thereby concurrently decomposing a cross-linking agent and a foaming agent contained in the composition and consequently giving rise to a foam, and subsequently mechanically deforming the resultant closed-cell foam thereby establishing intercommunication among the cells of the foam. In accordance with these methods, an open-cell foam of a cross-linked polyolefin having an open-cell ratio of 100% or close to 100% can be produced.

Since these methods require the shaped composition which has not been cross-linked to be thermally foamed under normal atmospheric pressure, namely in a metal mold which is not kept under an airtight condition, however, when the shaped composition is rapidly foamed, the produced foam is cracked by the friction between the composition in the process of foaming and the inner surface of the metal mold. For the purpose of solving this problem, in the production of an open-cell foam having a large thickness exceeding 100 mm, for example, the thermal foaming should be carried out mildly over a period of at least 100 minutes. As a result, the production suffers from inferior operational efficiency and the thickness of an unfoamed surface skin layer and an ununiformly foamed part occurring near the surface skin increases due to the protracted application of heat. Since these parts must be cut off the foam, the product suffers from poor material utilization. Further, the produced foam tends to betray a serious dispersion of cell diameter and physical properties. Thus, the methods under discussion have room for further improvement.

SUMMARY OF THE INVENTION

An object of this invention, therefore, is to provide a method of producing an open-cell foam of a cross-linked polyolefin exhibiting uniform physical properties and possessing a high open-cell ratio and enjoying high operational efficiency and high material utilization without suffering from the drawbacks of the prior arts mentioned above.

Another object of this invention is to provide a method which is capable of efficiently producing an open-cell foam of a cross-linked polyolefin of a large thickness enjoying uniformity of cell diameter and exhibiting an open-cell ratio of 100% or close to 100%.

Still another object of this invention is to provide a method which is capable of producing in an extremely high yield an open-cell foam of a cross-linked polyolefin having a thin skin, manifesting a high degree of expansion, and enjoying good quality.

To accomplish the objects described above, according to the first aspect of this invention, there is provided a method for the production of an open-cell foam of a cross-linked polyolefin, characterized by comprising the steps of thermally shaping under application of pressure a foamable and cross-linkable polyolefin composition capable of being heated with a microwave, irradiating the foamable and cross-linkable polyolefin composition with a microwave thereby heating said composition and effecting partial decomposition of a cross-linking agent and a foaming agent contained in the composition, externally heating under normal atmospheric pressure or a pressure approximating it the intermediate partially foamed product obtained by said step of heating with the microwave thereby inducing decomposition of the remainders of the cross-linking agent and foaming agent and consequently giving rise to a foam possessing cell membranes capable of being easily ruptured by mechanical deformation, and exerting a mechanical deformation to the resultant foam thereby establishing intercommunication among the cells.

In accordance with the second aspect of this invention, there is provided a method for the production of an open-cell foam of a cross-linked polyolefin, characterized by comprising the steps of thermally shaping under application of pressure a foamable and cross-linkable polyolefin composition capable of being heated with a microwave, heating the surface part of the resultant shaped foamable and cross-linkable polyolefin composition, irradiating with a microwave the foamable and cross-linkable polyolefin composition resulting from said step of partial heating of the surface thereby heating said composition and effecting partial decomposition of a cross-linking agent and foaming agent contained in the composition, externally heating under normal atmospheric pressure or a pressure approximating it the intermediate partially foamed product resulting from the aforementioned step of heating with the microwave thereby inducing decomposition of the remainders of the cross-linking agent and foaming agent and consequently giving rise to a foam possessing cell membranes capable of being easily ruptured by mechanical deformation, and exerting a mechanical deformation to the resultant foam thereby establishing intercommunication among the cells.

The foamable and cross-linkable polyolefin compositions which are capable of being heated with a microwave and, therefore, usable for the method of this invention include mixtures obtained by blending ethylene-vinyl acetate copolymer or mixtures of ethylenevinyl acetate copolymer with other polyolefin type resins with a foaming agent and a cross-linking agent, or mixtures obtained by blending polyolefin type resins with a foaming agent, a cross-linking agent, and a plasticizer, for example.

DETAILED DESCRIPTION OF THE INVENTION

The method of this invention is characterized by irradiating a foamable and cross-linkable polyolefin composition with a microwave thereby internally heating the composition and imparting an excited state to a foaming agent and a cross-linking agent contained in the composition and consequently enabling the composition to be partially and simultaneously foamed and cross-linked, and subsequently externally heating under normal atmospheric pressure or a pressure approximating it the composition in the ensuant state thereby effecting smooth decomposition of the foaming agent and cross-linking agent of the foamable and cross-linkable composition in a short span of time.

The idea of utilizing the heating with a microwave for the foaming of plastics has been heretofore known as disclosed in Japanese Patent Applications laid open to public inspection, KOKAI No. SHO 63-35319 and No. SHO 63-74629, for example. In the case of a foamable and cross-linkable polyolefin composition containing low-density polyethylene as a main component, however, it is difficult to heat this composition by exposure to the microwave. It has been ascertained to the inventors as a result of their study that even the foamable and cross-linkable polyolefin composition containing low-density polyethylene as a main component thereof is enabled to generate heat on exposure to the microwave by the incorporation of a plasticizer in the composition. A polyolefin type resin which is formed solely of ethylene-vinyl acetate copolymer does not require incorporation of a plasticizer therein for the purpose of manifesting the ability to generate heat on exposure to the microwave. A mixture of ethylene-vinyl acetate copolymer with other polyolefin type resin needs not rely on the addition of a plasticizer to manifest the ability to generate heat on exposure to the microwave so long as it has a vinyl acetate content in the range between 0.1 and 50% based on the total amount of the resin.

The methods which are disclosed in said Japanese Patent Applications laid open to public inspection, KOKAI No. SHO 63-35319 and No. SHO 63-74629 both effect thermal foaming of a polyolefin composition with the heat generated by exposure of the composition to a microwave during the interval between the time the foaming is started and the time the foaming is completed. Further, the inventions disclosed therein both cover techniques invariably concerning a closed-cell foam. When a foamable and cross-linkable composition is heated solely by the method of heating using a microwave as described above, the temperature increases and induces accelerated foaming and cross-linking in the central part of the foamable and cross-linkable composition, whereas retarded foaming and cross-linking proceed in the outer part of the composition. Thus, the produced foam has no uniformly fine cells throughout the entire volume thereof. In order to decompose the foaming agent and cross-linking agent in the outer part of the composition, the exposure of the composition to the microwave must be continued for a long time.

For this reason, the present invention, in using the microwave to effect internal heating of the foamable and cross-linkable composition, adopts a method which comprises allowing the heating of the composition with the microwave to proceed only to the extent of exciting the cross-linking agent and foaming agent in the central part of the composition and subsequently externally heating the composition under normal atmospheric pressure or a pressure approximating it thereby effecting decomposition of the remainders of the cross-linking agent and foaming agent. While the foaming agent is in the process of decomposition, the decomposition tends to proceed in the manner of a chain reaction owing to the heat of decomposition. When the foaming is effected solely by the heating with the microwave, a difference arises in the speed of progress of foaming and cross-linking between the central part and the outer part of the foamable and cross-linkable composition as described above. For this reason, the present invention contemplates allowing the heating with the microwave to proceed only to the extent of inducing partial decomposition barely enough to excite the cross-linking agent and foaming agent and subsequently externally heating the composition with external heating means thereby accelerating the speeds of foaming and cross-linking in the outer part of the composition and, at the same time, promoting the foaming and cross-linking throughout the entire volume of the composition. As a result, the time spent for the external heating in the latter step is generously decreased and the produced foam has a uniform cell diameter both in the central part and the outer part thereof and exhibits stable physical properties. Further, since the cross-linking and foaming are performed by two stages of heating, i.e. the heating with the microwave and the external heating mentioned above, the cross-linking agent and foaming agent are simultaneously decomposed to give rise to a foam which possesses cell membranes capable of being easily ruptured and enabled to intercommunicate with each other by means of a mechanical deformation. The present invention, therefore, can produce with considerably high productivity an open-cell foam of a cross-linked polyolefin having a large thickness and exhibiting uniform physical properties.

Then, in the second method of this invention, the surface of the foamable and cross-linkable polyolefin composition is heated to effect partial cross-linking in the surface part of the composition prior to the heating with the microwave mentioned above. To be specific, the second method is characterized by heating the surface of the foamable and cross-linkable composition thereby decomposing to a slight extent the foaming agent and cross-linking agent in the surface part of the composition and then irradiating the composition with a microwave thereby effecting internal heating of the composition, and finally subjecting the composition to external heating. By performing the cross-linking and foaming in the skin part prior to the heating with the microwave in the manner described above, the possible leak of gas from the shaped mass in the subsequent step can be precluded and the possible survival of the foaming agent and cross-linking agent from decomposition in the skin part can be avoided. Thus, the second method can produce in an unusually high yield an open-cell foam of a cross-linked polyolefin having a thinner skin and exhibiting better quality at a higher degree of expansion than the product of the first method described above.

Now, the method of this invention for the production of an open-cell foam of a cross-linked polyolefin will be described more specifically below.

First, a given polyolefin is mixed with a foaming agent, a cross-linking agent and optionally a foaming aid, a filler, a pigment, etc., and the resultant mixture is intimately kneaded with the mixing rolls heated or the like to prepare a foamable and cross-linkable polyolefin composition which can be heated by means of a microwave. A foamable and cross-linkable composition containing low-density polyethylene as a main component thereof is rendered fit for the heating with the microwave by having a plasticizer incorporated therein in addition to the components mentioned above.

Among the polyolefins, particularly an ethylene type resin excels in stretchability and proves especially advantageous for the production of an open-cell foam of a cross-linked polyolefin having an expansion degree more than 20 times the original volume. The ethylene type resins are homopolymers and copolymers having ethylene as a main ingredient thereof. Specifically, they include low-density polyethylene produced by the high-pressure process, low-density polyethylene produced by the low-pressure process (linear low-density polyethylene), high-density polyethylene produced by the low-pressure process, ethylene-vinyl acetate copolymer, ethylene-vinyl ester copolymers, ethylene-alkyl acrylate copolymers, ethylene-propylene type copolymers, ethylene-α-olefin type copolymers, and mixtures thereof, for example. Among other ethylene type resins cited above, ethylene-vinyl acetate copolymer and mixtures of ethylene-vinyl acetate copolymer with other olefin type resins mentioned above prove particularly advantageous. The resin in a simple form or in the form of a mixture which contains vinyl acetate has no use for the plasticizer which is incorporated in the resin for the purpose of rendering the resin fit for heating by the exposure to a microwave as described above or allows a reduction in the amount of this plasticizer to be used. The content of vinyl acetate is desired to be in the range between 0.1 and 50%, preferably between 0.8 and 30%, based on the total amount of the resin.

The cross-linking agents which are advantageously usable in this invention are organic peroxides. Example of organic peroxides include, but are not limited to: dicumyl peroxide, 1,1-di-t-butyl peroxy-3,3,5-trimethyl cyclohexane, 2,5-dimethyl-2,5-di-t-butyl peroxyhexane, 2,5-dimethyl-2,5-di-t-butyl peroxyhexine, α,α'-bis (t-butyl peroxy) diisopropyl benzene, t-butyl peroxy ketone, and t-butyl peroxy benzoate. The foaming agents which are advantageously usable herein are chemical foaming agents. Examples of such chemical foaming agents include, but are not limited to: azo type compounds such as azodicarbonamide and barium azodicarboxylates; nitroso type compounds such as dinitrosopentamethylene tetramine and trinitrosotrimethyl tri-amine; hydrazide type compounds such as p,p'-oxybisbenzene sulfonyl hydrazide; and sulfonyl semicarbazide type compounds such as p,p'-oxybisbenzene sulfonyl semicarbazide and toluene sulfonyl semicarbazide.

The plasticizer to be used may be selected from among the known plasticizers which are satisfactorily compatible with polyolefin type resins. The known plasticizers which meet the description include phthalic acid derivatives such as dimethyl phthalate, butyl benzyl phthalate, and dioctyl phthalate; adipic acid derivatives such as dioctyl adipate; sebacic acid derivatives such as dioctyl sebacate; maleic acid derivatives such as di-2-ethylhexyl maleate; citric acid derivatives such as acetyl tributyl citrate; phosphoric acid derivatives such as triphenyl phosphate; trimellitic acid derivatives; itaconic acid derivatives; polyester type compounds; and fatty acid type compounds, for example. Among other plasticizers cited above, the plasticizers which contain a benzene ring or an octyl group (2-ethylhexyl group) prove particularly desirable. Dioctyl phthalate is especially desirable.

The amount of such a plasticizer to be added is desired to be in the range between 1 and 20 parts by weight, preferably between 3 and 10 parts by weight, based on 100 parts by weight of the polyolefin type resin. When the amount of the plasticizer to be added is large, the added plasticizer enables the heating by means of a microwave to proceed efficiently and allows a cut in the time spent for the heating under normal atmospheric pressure in the subsequent step. If this amount is unduly large to exceed 20 parts by weight, however, the disadvantage ensues that the operation of kneading proceeds with poor efficiency, the finished product suffers from the phenomenon of bleeding, and the product is deficient in physical properties. It is, therefore, important that the plasticizer should be added at least in the amount of irreducible minimum. If the amount is less than 1 part by weight, however, the disadvantage arises that the heating with the microwave does not proceed efficiently.

When the polyolefin type resin is ethylene-vinyl acetate copolymer or a mixture of ethylene-vinyl acetate copolymer with other polyolefin type resin, it manifests the ability to generate heat on exposure to a microwave even in the absence of a plasticizer so long as the vinyl acetate content thereof is in the range between 0.1 and 50% as mentioned above. For the ethylene-vinyl acetate copolymer or the mixture of ethylene-vinyl acetate copolymer with other polyolefin type resin, therefore, the amount of a plasticizer to be incorporated therein must be varied depending on the vinyl acetate content of the resin. Further, the ethylene-vinyl acetate copolymer is liable to soften. When the copolymer of this nature incorporates a plasticizer therein, the resultant composition becomes unduly soft and impairs the efficiency of the operation of kneading. The composition of this quality entails the adverse phenomenon of gas leakage during the process of foaming under normal atmospheric pressure and does not easily give rise to a finished product of ideal quality. Thus, this composition requires the amount of the plasticizer to be small as compared with the composition using an ordinary polyethylene resin.

Examples of foaming aids optionally used in this invention include, but are not limited to: compounds having urea as a main component, metal compounds such as basic zinc carbonate, zinc oxide, and lead oxide, and compounds having salicylic acid, stearic acid, etc. as a main component, namely higher fatty acids and metal compounds of such higher fatty acids, for example.

Further, for the purpose of improving the physical properties of the composition to be used or lowering the price of the product, compounding agents (fillers) incapable of exerting any noticeable adverse effect on cross-linking bonding such as, for example, carbon black, metal oxides including zinc oxide, titanium oxide, calcium oxide, magnesium oxide and silicon oxide, carbonates including magnesium carbonate and calcium carbonate, fibrous substances including pulp, various dyes, pigments, and fluorescent substances, and rubber compounding ingredients commonly used, may be incorporated as occasion demands.

Then, the foamable and cross-linkable polyolefin composition which is obtained in consequence of the intimate kneading described above is charged in a metal mold and thermally shaped therein under the pressure applied with a press at a temperature in the range between 115° and 155° C., preferably between 120° and 140° C., depending on the kinds of resin and cross-linking agent in use. During this step of thermal shaping, the maintenance of the foamable and cross-linkable composition in the state where its gel percent is zero throughout the entire process of shaping is the condition for obtaining an open-cell foam having an open-cell ratio of 100% or close to 100%. There is the possibility of a very minute amount of the foaming agent yielding to initial decomposition during this step of thermal shaping and causing the shaped composition to expand to roughly twice the original volume at the time of removal from the mold. However, this phenomenon is far from the concept of foaming and does not matter at all for this invention.

The foamable and cross-linkable composition which has been shaped as described above is then set in place in a microwave irradiator and irradiated therein with a microwave. Though the microwave to be used for this irradiation is not specifically defined, a microwave of 2,450 MHz in frequency (12.3 cm in wavelength) is generally adopted. The wavelength of the microwave to be used is desired to be in the range between 1 and 50 cm.

The degree with which the foamable and cross-linkable composition is irradiated with the microwave, as expressed in terms of the linear expansion ratio of the composition in the direction of the maximum expansion immediately after the heating with the microwave, is desired to be in the range between 1.0 and 3.0 times, preferably between 1.1 and 2.0 times, the original size. The term "linear expansion ratio" as used herein refers to the ratio of change in the size of the foamable and cross-linkable composition. Since the expansion in the direction of thickness is generally largest, it normally suffices to control the linear expansion ratio in the direction of thickness within the range mentioned above. The time required for the heating with the microwave is desired to be in the range between 1 and 40 minutes, preferably between 2 and 30 minutes.

When the linear expansion ratio with the foamable and cross-linkable composition exhibits in the direction of maximum expansion in consequence of the heating with the microwave exceeds 3 times the original size, the cross-linking and foaming are accelerated excessively in the central part of the composition and the foaming is conversely retarded in the outer part of the composition, with the result that the produced foam has no uniform cell diameter throughout the entire volume thereof. If the heating with the microwave falls short of the prescribed extent, however, the heat subsequently applied externally under normal atmospheric pressure takes an unduly long time to reach the central part of the composition and the protracted heating induces collapse of the cells formed and consequently increases notably the thickness of the skin layer devoid of a foamed part.

The foamable and cross-linkable composition whose central part has been heated to a suitable extent in the manner described above is then heated under normal atmospheric pressure or a pressure approximating it thereby concurrently decomposing the cross-linking agent and the foaming agent. In this foaming and cross-linking step, the shaped composition is placed in a mold having desired cross-sectional shape and dimensions and not held in an airtight or hermetically sealed state and the metallic plate of the mold is externally heated to effect indirect heating of the composition held therein. The indirect heating is attained by attaching a heater fast to the outer surface of the metallic plate and energizing the heater and consequently heating the metallic plate or by providing the metallic plate with a flow path for a heat transfer medium and circulating a heat transfer medium such as steam or hot oil through the flow path (jacket system), and transferring the heat of the medium to the metallic plate.

Alternatively, the shaped polyolefin composition is placed in an openable mold not held in an airtight state and directly heated as immersed in a heating medium, for instance metal bath containing Rose's alloy, Wood's alloy or the like, oil bath, salt bath containing one or more of the molten salt such as sodium nitrate, potassium nitrate, potassium nitrite or the like. Otherwise, the shaped composition is directly heated in the current of nitrogen gas, or in the state as covered with an iron sheet, etc. capable of moving up and down. After the heating is continued for a prescribed time, it is cooled to obtain a cooled foam.

The heating temperature is set at a level selected in the range of from 140° C. to 210° C., preferably 160° C. to 190° C., to suit the kind of the polyolefin being used. The heating time is in the range of from 10 to 60 minutes, preferably 5 to 20 minutes.

In the second method of this invention, the foamable and cross-linkable composition is first thermally shaped under the pressure applied with a press in the same manner as described above and then the surface of the consequently shaped composition is heated. As the measure to perform the surface heating mentioned above, a method of bringing a heated metal surface into contact with the foamable and cross-linkable composition or a method of heating the composition as placed in a heating box such as an oven may be cited.

The heating temperature is desired to be in the range between 155° and 210° C., desirably between 170° and 200° C., and particularly desirably between 180° and 200° C. and the heating time is desired to be in the range between 3 and 30 minutes, desirably between 5 and 20 minutes, and particularly desirably between 5 and 10 minutes. The degree with which the surface of the foamable and cross-linkable composition is heated, as expressed in terms of gel percent, is desired to be in the range between 0 and 30%, desirably between 0.3 and 20%, and particularly desirably between 0.3 and 10%. For the determination of the gel percent, a part about 1 mm from the surface layer of a foamable and cross-linkable composition having a heated surface is used as a sample. The term "gel percent" as used herein means the ratio of the weight of the sample after extraction to that before extraction, which is determined by placing the sample in a basket of 200-mesh metal gauze and subjecting it to 24 hours' extraction under reflux of trichloroethylene as a solvent by means of a Soxhlet extractor.

The foamable and cross-linkable composition which has the surface thereof heated in the manner described above is then placed in a microwave irradiating device and irradiated therein with the microwave in the same manner as in the first method, subsequently heated externally under normal atmospheric pressure or a pressure approximating it, and then cooled, to produce a foam. The conditions for the heating with the microwave and the heating under normal atmospheric pressure are equal to those used in the first method.

In this way, there can be obtained a foam possessing cell membranes capable of being easily ruptured by mechanical deformation and exhibiting the same degree of cross-linking (up to about 95% of gel percent) as the conventional foamed article.

The foam (so-called closed-cell foam) obtained as described above is then subjected to compressive deformation using an even-speed two-roll press, for example, to rupture the cell membranes and give rise to an open-cell foam provided with intercommunicating cells. The intercommunication of the cells in the foam can be promoted by providing the even-speed two-roll press on the surface thereof with countless small needles or by disposing rolls provided on the surface thereof with countless small needles before and/or after the even-speed two-roll press and thereby puncturing countless small holes in the surface of the foam with the needles on the rolls.

By this method is obtained an open-cell foam possessing an open-cell ratio of 100% or close to 100% as measured in accordance with the Remington Pariser method.

Now, this invention will be described more specifically below with reference to working examples. As a matter of course, this invention is not limited to the following examples. It ought to be easily understood by any person of ordinary skill in the art that this invention allows various modifications within the scope of the spirit of this invention.

EXAMPLE 1

A composition consisting of 100 parts by weight of an ethylenevinyl acetate copolymer (product of Mitsubishi Petrochemical Co., Ltd. marketed under the tradename of "Yukalon EVA-41H", vinyl acetate content; 16% by weight), 17 parts by weight of azodicarbonamide, 0.7 part by weight of dicumyl peroxide, and 0.3 part by weight of zinc white was thoroughly kneaded by mixing rolls. The resultant blend was charged in a metal mold (180×180×40 mm) set in place in a press heated to 120° C. and thermally shaped under pressure (100 kg/cm$^2$) for 30 minutes.

Then, the shaped composition was placed in a microwave oven (produced by Sharp Corporation) and irradiated therein with a microwave (2,450 MHz in frequency and 700 W in output) for 5 minutes to effect internal heating of the shaped composition and induce partial decomposition of the cross-linking agent and foaming agent. The linear expansion ratio of the foamable and cross-linkable composition in the direction of thickness was about 1.3 times the original size.

The primary foamed product thus obtained was placed in an open-shut type metal mold (500×500×100 mm) heated already to 170° C. and not kept in an airtight state (the metal mold provided with the fluid channels for steam in the metal plates forming upper, lower, and lateral walls), heated for 30 minutes with steam kept at 170° C. and circulated through the jacket system, cooled, and then removed from the mold, to obtain a foam (500×500×100 mm).

The foam thus obtained was passed three times through even-speed rolls with a gap set at 8 mm to rupture the cell membranes in the form and establish intercommunication among the cells. The produced foam measured 500×500×95 mm, possessed a uniform cell diameter in both the central part and the skin part, and exhibited an apparent density of 0.03 g/cm$^3$ and an open-cell ratio of 100%.

COMPARATIVE EXPERIMENT 1

A foam was produced from the same composition as used in Example 1, under the same conditions as in Example 1 except that the irradiation with the microwave was omitted. In the central part of the foam thus obtained, the foaming agent remained undecomposed because the applied heat was not conducted to the central part. It took 120 minutes to attain thorough decomposition of the foaming agent and cross-linking agent exclusively by the heating with the steam circulated through the jacket system.

EXAMPLES 2 AND 3

Open-cell foams were obtained by faithfully following the procedure of Example 1, excepting the conditions for the irradiation with the microwave were varied as indicated in Table 2. In every Example a complete open-cell foam exhibiting an open-cell ratio of 100% was obtained.

The linear expansion ratio which the foamable and cross-linkable composition exhibited in the direction of thickness in consequence of the heating with the microwave was 1.75 times (Example 2) and 1.5 times (Example 3) the original size.

EXAMPLE 4

A composition consisting of 5 parts by weight of an ethylene-vinyl acetate copolymer (product of Mitsubishi Petrochemical Co., Ltd. marketed under the tradename of "Yukalon EVA-41H", vinyl acetate content: 16% by weight), 95 parts by weight of a low-density polyethylene (product of Mitsubishi Petrochemical Co., Ltd. marketed under the tradename of "Yukalon YF-30", MFR (Melt Flow Rate); 1.0 g/10 minutes, density; 0.92 g/cm$^3$), 17 parts by weight of azodicarbonamide, 0.8 part by weight of dicumyl peroxide, and 0.3 part by weight of zinc white was thoroughly kneaded by mixing rolls. The resultant blend was charged in a metal mold (180×180×40 mm) set in place in a press heated to 130° C. and thermally shaped under pressure (100 kg/cm$^2$) for 30 minutes.

Then, the shaped composition was placed in a microwave oven (produced by Sharp Corporation) and irradiated therein with a microwave (2,450 MHz in frequency and 700 W in output) for 10 minutes to effect internal heating of the shaped composition and induce partial decomposition of the cross-linking agent and foaming agent. The linear expansion ratio of the foamable and cross-linkable composition in the direction of thickness was about 1.2 times the original size.

The primary foamed product thus obtained was placed in the same open-shut type metal mold (500×500×100 mm) as used in Example 1, which was heated already to 170° C. and not kept in an airtight state, heated for 40 minutes with steam kept at 170° C. and circulated through the jacket system, cooled, and then removed from the mold, to obtain a foam (500×500×100 mm).

The foam thus obtained was passed three times through evenspeed rolls with a gap set at 8 mm to rupture the cell membranes in the form and establish intercommunication among the cells. The produced foam measured 500×500×90 mm, possessed a uniform cell diameter in both the central part and the skin part, and exhibited an apparent density of 0.03 g/cm$^3$ and an open-cell ratio of 100%.

EXAMPLE 5

A composition consisting of 100 parts by weight of an ethylene-vinyl acetate copolymer (product of Mitsubishi Petrochemical Co., Ltd. marketed under the tradename of "Yukalon EVA-41H", vinyl acetate content; 16% by weight), 17 parts by weight of azodicarbonamide, 0.7 part by weight of dicumyl peroxide, and 0.3 part by weight of zinc white was thoroughly kneaded by mixing rolls. The resultant blend was charged in a metal mold (180×180×40 mm) in a press heated to 120° C. and thermally shaped therein under pressure (100 kg/cm$^2$) for 30 minutes.

The shaped composition was placed in an oven preheated to 180° C. and heated therein for 10 minutes. The gel percent in the surface of the shaped composition was found to be 4%.

Then, the shaped composition was placed in a microwave oven (produced by Sharp Corporation) and irradiated therein with a microwave (2,450 MHz in frequency and 700 W in output) for 3 minutes to induce internal heating of the shaped composition and partial decomposition of the cross-linking agent and foaming agent. The linear expansion ratio which the foamable and cross-linkable composition exhibited in the direction of thickness in consequence of the heating was about 1.2 times the original size.

The primary foam thus obtained was placed in the same open-shut type metal mold (500×500×100 mm) as used in Example 1, which was heated already to 170° C. and not kept in an airtight state, heated for 10 minutes with steam kept at 170° C. and circulated through the jacket system, cooled, and then removed from the mold, to obtain a foam (500×500×100 mm).

The resultant foam was passed three times through even-speed rolls with a gap set at 8 mm to rupture the cell membranes in the foam and establish intercommunication among the cells. The produced foam measured 500×500×95 mm, possessed a uniform cell diameter in both the central part and the skin part of the foam, and exhibited an apparent density of 0.03 g/cm$^3$ and an open-cell ratio of 100%.

The formulations of the compositions used in Examples 1 to 5 and Comparative Experiment 1 are collectively shown in Table 1, and the conditions for production and the physical properties of the open-cell foams of cross-linked polyolefin respectively produced are collectively shown in Table 2.

TABLE 1

| | Formulation | | | | |
|---|---|---|---|---|---|
| | Resin | | Foaming agent, azodicarbonamide | Foaming aid, ZnO | Cross-linking agent, DCP |
| No. | EVA-41H | YF-30 | | | |
| Example 1 | 100 | — | 17 | 0.3 | 0.7 |
| Comparative Experiment 1 | 100 | — | 17 | 0.3 | 0.7 |
| Example 2 | 100 | — | 17 | 0.3 | 0.7 |
| Example 3 | 100 | — | 17 | 0.3 | 0.7 |
| Example 4 | 5 | 95 | 17 | 0.3 | 0.7 |
| Example 5 | 100 | — | 17 | 0.3 | 0.7 |

TABLE 2

| No. | Conditions for thermal shaping Temp. (°C.) | Conditions for thermal shaping Time (min.) | Conditions for heating in oven Temp. (°C.) | Conditions for heating in oven Time (min.) | Conditions for heating with microwave Output (W) | Conditions for heating with microwave Time (min.) | Conditions heating under normal pressure Temp. (°C.) | Conditions heating under normal pressure Time (min.) | Apparent density (g/cm$^3$) | Open-cell ratio (%) |
|---|---|---|---|---|---|---|---|---|---|---|
| Example 1 | 120 | 30 | — | — | 700 | 5 | 170 | 30 | 0.03 | 100 |
| Comparative Experiment 1 | 120 | 30 | — | — | — | — | 170 | 30 | — | — |
| | | | | | | | | 120 | 0.03 | 100 |
| Example 2 | 120 | 30 | — | — | 300 | 20 | 170 | 30 | 0.03 | 100 |
| Example 3 | 120 | 30 | — | — | 500 | 10 | 170 | 30 | 0.03 | 100 |
| Example 4 | 120 | 30 | — | — | 700 | 10 | 170 | 40 | 0.03 | 100 |
| Example 5 | 120 | 30 | 180 | 10 | 700 | 3 | 170 | 10 | 0.03 | 100 |

It is clearly noted from Table 2 that the combined use of the heating with the microwave and the heating under normal atmospheric pressure in accordance with the present invention brought out a notable decrease in the time required for the heating under normal atmospheric pressure. Further, when the surface of the shaped foamable and cross-linkable composition was heated in advance of the heating with the microwave as in Example 5, the total of the time required for the surface heating (in the oven) and the time required for the heating under normal atmospheric pressure was shorter than the time required for the heating under normal atmospheric pressure in Examples 1 to 4 and the skin of the foam was very thin. Example 6:

A composition consisting of a mixture obtained by combining a low-density polyethylene (product of Mitsubishi Petrochemical Co., Ltd. marketed under the tradename of "Yukalon YF-30, MFR; 1.0 g/10 min., density; 0.92 g/cm$^3$) and an ethylene-vinyl acetate copolymer (product of Mitsubishi Petrochemical Co., Ltd. marketed under the tradename of "Yukalon EVA-41H", vinyl acetate content; 16% by weight) in a varying ratio indicated in Table 3, 17 parts by weight of azodicarbonamide, 0.8 part by weight of dicumyl peroxide, and 0.3 part by weight of zinc white was thoroughly kneaded by mixing rolls. An open-cell foam was produced from the resultant blend by following the procedure of Example 1, excepting the conditions for the thermal shaping, the heating with the microwave, and the heating under normal atmospheric pressure were varied as indicated in Table 3. After the cooling, the foam (500×500×100 mm) was removed from the mold.

The linear expansion ratio which the foamable and cross-linkable composition exhibited in the direction of thickness in consequence of the heating with the microwave was 1.3 times (Run No. 1), 1.2 times (Run No. 2), 1.5 times (Run No. 3), and 1.2 times (Run No. 4) the original size, respectively.

The resultant foam was passed three times through even-speed rolls with a gap set at 8 mm to rupture the cell membranes in the foam and establish intercommunication among the cells. The produced foam measured 500×500×90 mm and exhibited an apparent density of 0.03 g/cm³.

The various open-cell foams of cross-linked polyolefins obtained as described above were tested for permanent compression set.

This test was carried out by a procedure which comprised preparing a test piece in the form of a rectangular solid 50 mm in length, 50 mm in width, and 25 mm in thickness, measuring the thickness in the central part of the test piece, interposing the test piece between two parallel compression plates, compressing it to 50% of the original thickness, allowing the test piece in the compressed state for 22 hours, then removing it from between the compression plates, allowing to stand at rest for 24 hours, and measuring the thickness in the same part of the test piece. The compression set C (%) was calculated in accordance with the following formula.

$$C = (t_0 - t_1)/t_0 \times 100$$

where,
$t_0$: Thickness of test piece before compression, and
$t_1$: Thickness of test piece after testing.

Three test pieces were cut from each of the open-cell foams and tested for compression set. The average value of the results of the determination of compression set for each open-cell foam is shown in Table 3.

TABLE 3

| Run No. | EVA (parts by weight) | LD-PE (parts by weight) | Conditions for thermal shaping Temp. (°C.) | Conditions for thermal shaping Time (min.) | Conditions for heating with microwave Output (W) | Conditions for heating with microwave Time (min.) | Conditions for heating under normal pressure Temp. (°C.) | Conditions for heating under normal pressure Time (min.) | Compression set (%) |
|---|---|---|---|---|---|---|---|---|---|
| 1 | 100 | — | 120 | 30 | 700 | 5 | 170 | 30 | 2.58 |
| 2 | 80 | 20 | 120 | 30 | 700 | 5 | 170 | 30 | 2.82 |
| 3 | 50 | 50 | 130 | 30 | 700 | 5 | 170 | 30 | 2.93 |
| 4 | 5 | 95 | 130 | 30 | 700 | 10 | 170 | 40 | 4.60 |

It is clearly noted from the results shown in Table 3 that when the ethylene-vinyl acetate copolymer is incorporated in a small ratio in the composition, the foam produced will be deficient in the capacity for elastic recovery. When the composition contains the ethylene-vinyl acetate copolymer in an amount calculated to produce the composition having a vinyl acetate content of at least 8%, based on 100% by weight of the resin, the open-cell foam produced from this composition excels in such physical properties as elasticity, hand and feel, and the like.

Further, when the ethylene-vinyl acetate copolymer is incorporated in a small ratio in the composition, the resultant composition does not easily generate heat on exposure to a microwave and renders internal heating difficult and, therefore, requires to elongate the time spent for the heating under normal atmospheric pressure. Exclusively from the standpoint of the heating time, the amount of vinyl acetate ingredient to be contained in the resin is desired to be at least 8% by weight, based on 100% by weight of the resin.

EXAMPLE 7

A composition consisting of 100 parts by weight of a low-density polyethylene (product of Mitsubishi Petrochemical Co., Ltd. marketed under tradename of "Yukalon YF-30", MFR; 1.0 g/10 min., density; 0.92 g/cm³), 17 parts by weight of azodicarbonamide, 0.3 part by weight of zinc white, 0.7 part by weight of dicumyl peroxide, and 10 parts by weight of dioctyl phthalate was kneaded thoroughly and dispersed uniformly by mixing rolls. The resultant blend was charged in a metal mold (180×180×40 mm) kept in a press heated to 125° C. and thermally shaped therein at the temperature mentioned above under pressure (100 kg/cm²) for 30 minutes.

The shaped composition was placed in an oven preheated to 200° C. and heated therein for 5 minutes. The gel percent in the surface of the shaped composition was 0.4%.

Then, the shaped composition was placed in a microwave oven (produced by Hitachi Home-Tech K.K.) and heated therein by irradiation with a microwave (2,450 MHz in frequency and 600 W in output) for 6 minutes to induce partial decomposition of the cross-linking agent and foaming agent and give rise to an intermediate partially foamed product. The linear expansion ratio of this intermediate partially foamed product in the direction of thickness was about 1.5 times the original size.

This intermediate partially foamed product was placed in an open-shut type metal mold (500×500×100 mm) heated already to 170° C. and not kept in an airtight state (the mold provided with the fluid channels for steam in the metal plates forming upper, lower, and lateral walls), heated for 16 minutes with steam kept at 170° C. and circulated through the jacket system, cooled, and then removed from the mold, to obtain a foam (500×500×100 nm).

The resultant foam was passed three times through an even-speed two-roll press with a gap set at 8 mm to rupture the cell membranes in the foam and establish intercommunication among the cells. The foam now containing open cells measured 500×500×90 nm, exhibited an apparent density of 0.03 g/cm³ and an open-cell ratio of 100%, and possessed uniform cell diameter in both the central part and the skin part of the foam.

EXAMPLES 8 TO 16

Open-cell foams were produced by following the procedure of Example 7, excepting the kind and amount of plasticizer to be used were varied as indicated in Table 4 and the conditions for the surface heating of the shaped composition in the oven, the heating with the microwave, and the heating under normal atmospheric pressure were varied as indicated in Table 5.

The foams obtained in these examples, after establishment of intercommunication among the cells, invariably measured 500×500×90 mm, exhibited an apparent density of 0.030 g/cm$^3$ and an open-cell ratio of 100%, and possessed a uniform cell diameter in both the central part and the skin part. In every Example, the gel percent in the surface of the shaped composition obtained after the surface heating in the oven was found to be 0.4%, and the linear expansion ratio which the intermediate partially foamed product exhibited in the direction of thickness in consequence of the heating with the microwave was 1.5 times the original size.

EXAMPLE 17

A composition consisting of 100 parts by weight of a low-density polyethylene (product of Mitsubishi Petrochemical Co., Ltd. marketed under tradename of "Yukalon YF-30"), 17 parts by weight of azodicarbonamide, 0.7 part by weight of dicumyl peroxide, 0.3 part by weight of zinc white, and 5 parts by weight of butyl benzyl phthalate was thoroughly kneaded by mixing rolls. The resultant blend was charged in a metal mold (180×180×40 mm) kept in a press heated to 125° C. and thermally shaped therein at the temperature mentioned above under pressure (100 kg/cm$^2$) for 30 minutes.

Then, the shaped composition was placed in a microwave oven (produced by Hitachi Home-Tech K.K.) and heated therein by irradiation with a microwave (2,450 MHz in frequency and 600 W in output) for 13 minutes to induce partial decomposition of the crosslinking agent and foaming agent and give rise to an intermediate partially foamed product. The linear expansion ratio of this intermediate partially foamed product in the direction of thickness was about 1.5 times the original size.

This intermediate partially foamed product was placed in an open-shut type metal mold (500×500×100 mm) heated already to 170° C. and not kept in an airtight state (the mold provided with the fluid channels for steam in the metal plates forming upper, lower, and lateral walls), heated for 27 minutes with steam kept at 170° C. and circulated through the jacket system, cooled, and then removed from the mold, to obtain a foam (500×500×100 mm).

The resultant foam was passed three times through an even-speed two-roll press with a gap set at 8 mm to rupture the cell membranes in the foam and establish intercommunication among the cells. The foam now containing open cells measured 500×500×90 mm, exhibited an apparent density of 0.03 g/cm$^3$ and an open-cell ratio of 100%, and possessed uniform cell diameter in both the central part and the skin part.

EXAMPLE 18

A composition consisting of 100 parts by weight of a low-density polyethylene (product of Mitsubishi Petrochemical Co., Ltd. marketed under tradename of "Yukalon YF-30"), 17 parts by weight of azodicarbonamide, 0.3 part by weight of zinc white, 0.7 part by weight of dicumyl peroxide, and 20 parts by weight of dioctyl phthalate was kneaded thoroughly and dispersed uniformly by mixing rolls. The resultant blend was charged in a metal mold (180×180×40 mm) kept in a press heated to 125° C. and thermally shaped therein at the temperature mentioned above under pressure (100 kg/cm$^2$) for 30 minutes.

The shaped composition was placed in an oven preheated to 200° C. and heated therein for 5 minutes. The gel percent in the surface of the shaped composition was 0.4%.

Then, the shaped composition was placed in a microwave oven (produced by Hitachi Home-Tech K.K.) and heated therein by irradiation with a microwave (2,450 MHz in frequency and 600 W in output) for 3 minutes to induce partial decomposition of the crosslinking agent and foaming agent and give rise to an intermediate partially foamed product. The linear expansion ratio of this intermediate partially foamed product in the direction of thickness was about 1.5 times the original size.

This intermediate partially foamed product was placed in an open-shut type metal mold (500×500×100 mm) heated already to 170° C. and not kept in an airtight state (the mold provided with the fluid channels for steam in the metal plates forming upper, lower, and lateral walls), heated for 15 minutes with steam kept at 170° C. and circulated through the jacket system, cooled, and then removed from the mold, to obtain a foam (500×500×100 mm).

The resultant foam was passed three times through an even-speed two-roll press with a gap set at 8 mm to rupture the cell membranes in the foam and establish intercommunication among the cells. The foam now containing open cells measured 500×500×90 mm, exhibited an apparent density of 0.03 g/cm$^3$ and an open-cell ratio of 100%, and possessed uniform cell diameter in both the central part and the skin part.

Production of an open-cell foam was tried by faithfully following the procedure of Example 18, excepting the amount of dioctyl phthalate to be added was changed to 30 parts by weight. The composition could not be easily kneaded by the mixing rolls. Only after several futile attempts, it was rendered barely fit for kneading. When the composition was subjected to thermal foaming under the same conditions as in Example 18, no foam was obtained because of leakage of gas.

EXAMPLE 19

A composition consisting of 100 parts by weight of an ethylene-vinyl acetate copolymer (product of Mitsubishi Petrochemical Co., Ltd. marketed under tradename of "Yukalon EVA-41H", vinyl acetate content; 16% by weight), 17 parts by weight of azodicarbonamide, 0.7 part by weight of dicumyl peroxide, 0.3 part by weight of zinc white, and 2 parts by weight of dioctyl phthalate was thoroughly kneaded by mixing rolls. The resultant blend was charged in a metal mold (180×180×40 mm) kept in a press heated to 125° C. and thermally shaped therein under pressure (100 kg/cm$^2$) for 30 minutes.

The shaped composition was placed in an oven preheated to 200° C. and heated therein for 5 minutes. The gel percent in the surface of the shaped composition was 1.0%.

Then, the shaped composition was placed in a microwave oven (produced by Hitachi Home-Tech K.K.) and heated therein by irradiation with a microwave (2,450 MHz in frequency and 600 W in output) for 5 minutes to induce partial decomposition of the crosslinking agent and foaming agent and give rise to an intermediate partially foamed product. The linear expansion ratio of this intermediate partially foamed product in the direction of thickness was about 1.5 times the original size.

This intermediate partially foamed product was placed in an open-shut type metal mold (500×500×100 mm) heated already to 170° C. and not kept in an airtight state (the mold provided with the fluid channels for steam in the metal plates forming upper, lower, and lateral walls), heated for 10 minutes with steam kept at 170° C. and circulated through the jacket system, cooled, and then removed from the mold, to obtain a foam (500×500×100 mm).

The resultant foam was passed three times through an even-speed two-roll press with a gap set at 8 mm to rupture the cell membranes in the foam and establish intercommunication among the cells. The produced foam now containing open cells measured 500×500×95 mm, exhibited an apparent density of 0.03 g/cm$^3$ and an open-cell ratio of 100%, and possessed uniform cell diameter in both the central part and the skin part of the foam.

COMPARATIVE EXPERIMENT 2

An open-cell foam was produced by following the procedure of Example 8, excepting the surface heating of the shaped composition in the oven and the heating by irradiation with the microwave were omitted. It took 100 minutes to effect perfect decomposition of the foaming agent and cross-linking agent solely by the heating with the steam circulated through the jacket system.

COMPARATIVE EXPERIMENT 3

The same composition as used in Example 7 except for omission of the use of the plasticizer was thoroughly kneaded by mixing rolls. The resultant blend was charged in a metal mold (180×180×40 mm) kept in a press heated to 125° C. and thermally shaped therein under pressure (100 kg/cm$^2$) for 30 minutes.

The resultant shaped composition was heated for 5 minutes in an oven preheated to 200° C., then placed in a microwave oven (produced by Hitachi Home-Tech K.K.), and irradiated with a microwave (2,450 MHz in frequency and 600 W in output) therein. The heating aimed at was not attained even by 30 minutes' exposure to the microwave.

The formulations of the compositions produced in Examples 7 to 19 and Comparative Experiments 2 and 3 are collectively shown in Table 4, and the conditions for the production and the physical properties of the open-cell foams of cross-linked polyolefins are collectively shown in Table 5.

TABLE 4

(parts by weight)

| No. of Examples and Comparative Experiments* | Resin | | Foaming agent, azodicarbon-amide | Foaming aid, ZnO | Cross-linking agent, DCP | Plasticizer *1) | | | | | | |
|---|---|---|---|---|---|---|---|---|---|---|---|---|
| | YF-30 | EVA-41H | | | | DOP | TPP | DMP | BBP | ATBC | DOA | DOS |
| 7  | 100 | —   | 17 | 0.3 | 0.7 | 10 | — | — | — | — | — | — |
| 8  | 100 | —   | 17 | 0.3 | 0.7 | 5  | — | — | — | — | — | — |
| 9  | 100 | —   | 17 | 0.3 | 0.7 | 3  | — | — | — | — | — | — |
| 10 | 100 | —   | 17 | 0.3 | 0.7 | — | — | — | 1 | — | — | — |
| 11 | 100 | —   | 17 | 0.3 | 0.7 | — | — | — | 5 | — | — | — |
| 12 | 100 | —   | 17 | 0.3 | 0.7 | — | 5 | — | — | — | — | — |
| 13 | 100 | —   | 17 | 0.3 | 0.7 | — | — | — | — | — | 5 | — |
| 14 | 100 | —   | 17 | 0.3 | 0.7 | — | — | — | — | — | — | 5 |
| 15 | 100 | —   | 17 | 0.3 | 0.7 | — | — | — | — | 5 | — | — |
| 16 | 100 | —   | 17 | 0.3 | 0.7 | — | — | 5 | — | — | — | — |
| 17 | 100 | —   | 17 | 0.3 | 0.7 | — | — | — | 5 | — | — | — |
| 18 | 100 | —   | 17 | 0.3 | 0.7 | 20 | — | — | — | — | — | — |
| 19 | —   | 100 | 17 | 0.3 | 0.7 | 2  | — | — | — | — | — | — |
| 2* | 100 | —   | 17 | 0.3 | 0.7 | 5  | — | — | — | — | — | — |
| 3* | 100 | —   | 17 | 0.3 | 0.7 | —  | — | — | — | — | — | — |

*1) DOP: Dioctyl phthalate.
TPP: TRiphenyl phophate.
DMP: Dimethyl phthalate.
BBP: Butyl benzyl phthalate.
ATBC: Acetyl tributyl citrate.
DOA: Dioctyl adipate.
DOS: Dioctyl sebacate

TABLE 5

| No. of Examples and Comparative Experiments* | Conditions for thermal shaping | | Conditions for heating in oven | | Conditions for heating with microwave | | Conditions for heating under normal pressure | | Apparent density (%) | Open-cell ratio (times) | Maximum expansion ratio (%) | Gel percent in skin |
|---|---|---|---|---|---|---|---|---|---|---|---|---|
| | Temp. (°C.) | Time (min.) | Temp. (°C.) | Time (min.) | Output (W) | Time (min.) | Temp. (°C.) | Time (min.) | | | | |
| 7  | 125 | 30 | 200 | 5 | 600 | 6  | 170 | 16  | 0.03 | 100 | 1.5 | 0.4 |
| 8  | 125 | 30 | 200 | 5 | 600 | 6  | 170 | 18  | 0.03 | 100 | 1.5 | 0.4 |
| 9  | 125 | 30 | 200 | 5 | 600 | 8  | 170 | 25  | 0.03 | 100 | 1.5 | 0.4 |
| 10 | 125 | 30 | 200 | 8 | 600 | 18 | 170 | 35  | 0.03 | 100 | 1.5 | 0.4 |
| 11 | 125 | 30 | 200 | 5 | 600 | 8  | 170 | 20  | 0.03 | 100 | 1.5 | 0.4 |
| 12 | 125 | 30 | 200 | 5 | 600 | 8  | 170 | 18  | 0.03 | 100 | 1.5 | 0.4 |
| 13 | 125 | 30 | 200 | 5 | 600 | 11 | 170 | 23  | 0.03 | 100 | 1.5 | 0.4 |
| 14 | 125 | 30 | 200 | 5 | 600 | 11 | 170 | 24  | 0.03 | 100 | 1.5 | 0.4 |
| 15 | 125 | 30 | 200 | 5 | 600 | 11 | 170 | 23  | 0.03 | 100 | 1.5 | 0.4 |
| 16 | 125 | 30 | 200 | 5 | 600 | 11 | 170 | 25  | 0.03 | 100 | 1.5 | 0.4 |
| 17 | 125 | 30 | —   | — | 600 | 13 | 170 | 27  | 0.03 | 100 | 1.5 | 0   |
| 18 | 125 | 30 | 200 | 5 | 600 | 3  | 170 | 15  | 0.03 | 100 | 1.5 | 0.4 |
| 19 | 125 | 30 | 200 | 5 | 600 | 5  | 170 | 10  | 0.03 | 100 | 1.5 | 1.0 |
| 2* | 125 | 30 | —   | — | —   | —  | 170 | 100 | 0.03 | 100 | 0   | 0   |

TABLE 5-continued

| No. of Examples and Comparative Experiments* | Conditions for thermal shaping | | Conditions for heating in oven | | Conditions for heating with microwave | | Conditions for heating under normal pressure | | Apparent density (%) | Open-cell ratio (times) | Maximum expansion ratio (%) | Gel percent in skin |
|---|---|---|---|---|---|---|---|---|---|---|---|---|
| | Temp. (°C.) | Time (min.) | Temp. (°C.) | Time (min.) | Output (W) | Time (min.) | Temp. (°C.) | Time (min.) | | | | |
| 3* | 125 | 30 | 200 | 5 | 600 | 30 | — | — | — | — | — | — |

What we claim is:

1. A method for the production of open-cell foams of cross-linked polyolefins comprising the steps of:
   thermally shaping to an original size under application of pressure a foamable and cross-linkable polyolefin composition capable of being heated with a microwave,
   irradiating said foamable and cross-linkable polyolefin composition with a microwave thereby heating said composition and effecting partial decomposition of a cross-linking agent and a foaming agent contained in said composition so that said foamable and cross-linkable polyolefin composition is foamed so as to exhibit a linear expansion ratio in a range between more than 1.0 and 3.0 times the original size in the direction of maximum expansion,
   placing an intermediate partially foamed product obtained by said step of heating with the microwave in a metal mold not kept in a tightly closed state and substantially indirectly heating said intermediate partially foamed product through a metal plate of said mold under normal atmospheric pressure or a pressure approximating it thereby effecting decomposition of remaining cross-linking agent and foaming agent and consequently giving rise to a foam possessing cell membranes capable of being easily ruptured by mechanical deformation, and
   exerting a mechanical deformation to the resultant foam thereby establishing intercommunication among the cells.

2. A method according to claim 1, wherein said foamable and cross-linkable polyolefin composition capable of being heated with a microwave is a mixture obtained by blending an ethylene-vinyl acetate copolymer or a mixture of said ethylene-vinyl acetate copolymer with other polyolefin type resin with a foaming agent and a cross-linking agent.

3. A method according to claim 2, wherein said mixture of ethylene-vinyl acetate copolymer with other polyolefin type resin has a vinyl acetate content in the range between 0.1 and 50%, based on the total amount of resin.

4. A method according to claim 1, wherein said foamable and cross-linkable polyolefin composition capable of being heated with a microwave is a mixture obtained by blending a polyolefin type resin with a foaming agent, a cross-linking agent, and a plasticizer.

5. A method according to claim 4, wherein said plasticizer is at least one member selected from the group consisting of phthalic acid derivatives, adipic acid derivatives, sebacic acid derivatives, maleic acid derivatives, citric acid derivatives, phosphoric acid derivatives, trimellitic acid derivatives, and itaconic acid derivatives.

6. A method according to claim 4, wherein the amount of said plasticizer to be incorporated in said composition is in the range between 1 and 20 parts by weight, based on 100 parts by weight of said polyolefin type resin.

7. A method according to claim 2 or claim 4, wherein said foamable and cross-linkable polyolefin composition capable of being heated with a microwave contains a foaming aid.

8. A method according to claim 2 or claim 4, wherein said foamable and cross-linkable polyolefin composition capable of being heated with a microwave contains a compounding agent or filler, such as carbon black, a metal oxide, a carbonate, a fibrous substance, a dye, a pigment, a fluorescent substance, and a rubber compounding ingredient.

9. A method according to claim 1, wherein said thermal shaping of said foamable and cross-linkable polyolefin composition capable of being heated with a microwave is carried out at a temperature in the range between 115° and 155° C. while maintaining its gel percent at zero, wherein the gel percent is the ratio of the weight of a sample of said composition after extraction to that before extraction which is determined by placing the sample in a basket of 200-mesh metal gauze and subjecting it to 24 hours' extraction under reflux of trichloroethylene as a solvent by means of a Soxhlet extractor.

10. A method according to claim 1, wherein said heating with a microwave is effected by using a microwave having a wavelength in the range between 1 and 50 cm.

11. A method according to claim 1, wherein said heating of said intermediate partially foamed product under normal atmospheric pressure or a pressure approximating it is carried out by heating the metal plate of said metal mold to a temperature in the range between 140° and 210° C. for a period in the range between 1 and 60 minutes.

12. A method according to claim 1, wherein said establishment of intercommunication among the cells in said foam is effected by compressing said foam with an even-speed two-roll press or by compressing said foam with an even-speed two-roll press and, at the same time, puncturing countless small holes in the surface of said foam with a roll provided with small needles.

13. A method for the production of open-cell foams of cross-linked polyolefins comprising the steps of:
   thermally shaping to an original size under application of pressure a foamable and cross-linkable polyolefin composition capable of being heated with a microwave,
   heating only the surface part of said shaped foamable and cross-linkable polyolefin composition,
   irradiating with a microwave said foamable and cross-linkable polyolefin composition resulting from said step of heating only the surface thereby heating said composition and effecting partial decomposition of a cross-linking agent and a foaming agent contained in said composition so that said foamable and cross-linkable polyolefin composition is foamed so as to exhibit a linear expansion ratio in a range between more than 1.0 and 3.0 times the original size in the direction of maximum expansion.

placing an intermediate partially foamed product obtained by said step of heating with the microwave in a metal mold not kept in a tightly closed state and substantially indirectly heating said intermediate partially foamed product through a metal plate of said mold under normal atmospheric pressure or a pressure approximating it thereby inducing decomposition of remaining cross-linking agent and foaming agent and consequently giving rise to a foam possessing cell membranes capable of being easily ruptured by mechanical deformation, and exerting a mechanical deformation to the resultant foam thereby establishing intercommunication among the cells.

14. A method according to claim 13, wherein said foamable and cross-linkable polyolefin composition capable of being heated with a microwave is a mixture obtained by blending an ethylene-vinyl acetate copolymer or a mixture of said ethylene-vinyl acetate copolymer with other polyolefin type resin with a foaming agent and a cross-linking agent.

15. A method according to claim 14, wherein said mixture of ethylene-vinyl acetate copolymer with other polyolefin type resin has a vinyl acetate content in the range between 0.1 and 50%, based on the total amount of resin.

16. A method according to claim 13, wherein said foamable and cross-linkable polyolefin composition capable of being heated with a microwave is a mixture obtained by blending a polyolefin type resin with a foaming agent, a cross-linking agent, and a plasticizer.

17. A method according to claim 16, wherein said plasticizer is at least one member selected from the group consisting of phthalic acid derivatives, adipic acid derivatives, sebacic acid derivatives, maleic acid derivatives, citric acid derivatives, phosphoric acid derivatives, trimellitic acid derivatives, and itaconic acid derivatives.

18. A method according to claim 16, wherein the amount of said plasticizer to be incorporated in said composition is in the range between 1 and 20 parts by weight, based on 100 parts by weight of said polyolefin type resin.

19. A method according to claim 14 or claim 16, wherein said foamable and cross-linkable polyolefin composition capable of being heated with a microwave contains a foaming aid.

20. A method according to claim 14 or claim 16, wherein said foamable and cross-linkable polyolefin composition capable of being heated with a microwave contains a compounding agent or filler, such as carbon black, a metal oxide, a carbonate, a fibrous substance, a dye, a pigment, a fluorescent substance, and a rubber compounding ingredient.

21. A method according to claim 13, wherein said thermal shaping of said foamable and cross-linkable polyolefin composition capable of being heated with a microwave is carried out at a temperature in the range between 115° and 155° C. while maintaining its gel percent at zero, wherein the gel percent is the ratio of the weight of a sample of said composition after extraction to that before extraction which is determined by placing the sample in a basket of 200-mesh metal gauze and subjecting it to 24 hours' extraction under reflux of trichloroethylene as a solvent by means of a Soxhlet extractor.

22. A method according to claim 13, wherein said step of heating the surface part of said foamable and cross-linkable polyolefin composition is effected by heating the surface of said composition to a temperature in the range between 155° and 210° C. thereby partially cross-linking said surface to a state possessing a gel percent in the range between 0 and 30%.

23. A method according to claim 13, wherein said step of heating the surface part of said foamable and cross-linkable polyolefin composition is effected by bringing a heated metal surface into contact with said composition or heating said composition in an oven.

24. A method according to claim 13, wherein said heating with a microwave is effected by using a microwave having a wavelength in the range between 1 and 50 cm.

25. A method according to claim 13, wherein said heating of said intermediate partially foamed product under normal atmospheric pressure or a pressure approximating it is carried out by heating the metal plate of said metal mold to a temperature in the range between 140° and 210° C. for a period in the range between 1 and 60 minutes.

26. A method according to claim 13, wherein said establishment of intercommunication among the cells in said foam is effected by compressing said foam with an even-speed two-roll press or by compressing said foam with an even-speed two-roll press and, at the same time, puncturing countless small holes in the surface of said foam with a roll provided with small needles.

* * * * *